United States Patent
Ogawa (10) Patent No.: US 10,275,973 B2
(45) Date of Patent: Apr. 30, 2019

(54) PAPER SHEET HANDLING APPARATUS AND METHOD FOR CONTROLLING PAPER SHEET HANDLING APPARATUS

(71) Applicant: FUJITSU FRONTECH LIMITED, Inagi (JP)

(72) Inventor: Tomoaki Ogawa, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 0 days.

(21) Appl. No.: 15/914,466

(22) Filed: Mar. 7, 2018

(65) Prior Publication Data
US 2018/0197363 A1 Jul. 12, 2018

Related U.S. Application Data

(63) Continuation of application No. PCT/JP2015/076555, filed on Sep. 17, 2015.

(51) Int. Cl.
*B65H 43/00* (2006.01)
*G07D 11/26* (2019.01)
(Continued)

(52) U.S. Cl.
CPC .......... *G07D 11/26* (2019.01); *B65H 29/125* (2013.01); *B65H 43/00* (2013.01); *G06F 1/18* (2013.01);
(Continued)

(58) Field of Classification Search
CPC ..... B65H 43/00; B65H 26/00; G07D 11/0063
See application file for complete search history.

(56) References Cited

U.S. PATENT DOCUMENTS

| | | | |
|---|---|---|---|
| 5,383,081 A | 1/1995 | Nishikawa | |
| 2007/0014134 A1* | 1/2007 | Shih | H02H 9/001 363/52 |
| 2007/0212103 A1* | 9/2007 | Kikuchi | G03G 15/0283 399/88 |
| 2015/0170452 A1* | 6/2015 | Chugo | G07D 11/0018 194/206 |

FOREIGN PATENT DOCUMENTS

| | | |
|---|---|---|
| JP | 53-9597 | 1/1978 |
| JP | 59-40947 | 3/1984 |

(Continued)

OTHER PUBLICATIONS

International Search Report dated Nov. 10, 2015 in corresponding International Patent Application No. PCT/JP2015/076555.
(Continued)

*Primary Examiner* — Howard J Sanders
(74) *Attorney, Agent, or Firm* — Staas & Halsey LLP (57) ABSTRACT

A control unit; a banknote handling module that includes a conveying mechanism, a first control circuit, and a second control circuit that is controlled by the first control circuit and that controls the conveying mechanism; a power supply unit; a first power supply cable that supplies electrical power from the power supply unit to the first control circuit; and a second power supply cable that supplies electrical power from the power supply unit to the second control circuit. The first control circuit includes a first connecting portion to which the first power supply cable is connected and a first hot plug-in circuit that is connected to the first connecting portion. The second control circuit includes a second connecting portion to which the second power supply cable is connected and a second hot plug-in circuit that is connected to the second connecting portion.

4 Claims, 5 Drawing Sheets

(51) Int. Cl.
  *G07D 11/13* (2019.01)
  *G07D 11/14* (2019.01)
  *G07D 11/18* (2019.01)
  *G07D 11/22* (2019.01)
  *G07D 11/50* (2019.01)
  *G06F 1/18* (2006.01)
  *G07D 9/00* (2006.01)
  *B65H 29/12* (2006.01)
  *G07D 11/00* (2019.01)
  *B65H 26/00* (2006.01)

(52) U.S. Cl.
  CPC ........... *G07D 9/00* (2013.01); *G07D 11/0012* (2013.01); *G07D 11/0018* (2013.01); *G07D 11/0033* (2013.01); *G07D 11/0036* (2013.01); *G07D 11/0063* (2013.01); *G07D 11/0084* (2013.01); *G07D 11/13* (2019.01); *G07D 11/14* (2019.01); *G07D 11/18* (2019.01); *G07D 11/22* (2019.01); *G07D 11/50* (2019.01); *B65H 26/00* (2013.01); *B65H 2701/1912* (2013.01); *G07D 2211/00* (2013.01)

(56) References Cited

FOREIGN PATENT DOCUMENTS

| | | |
|---|---|---|
| JP | 60-166075 | 11/1985 |
| JP | 3-283279 | 12/1991 |
| JP | 4-148406 | 5/1992 |
| JP | 6-224573 | 8/1994 |
| JP | 6-274742 | 9/1994 |
| JP | 10-49728 | 2/1998 |
| JP | 2010-282391 | 12/2010 |
| JP | 2011-186857 | 9/2011 |

OTHER PUBLICATIONS

Written Opinion of the International Searching Authority dated Nov. 10, 2015 in corresponding International Patent Application No. PCT/JP2015/076555.

Japanese Office Action dated Nov. 13, 2018 from Japanese Patent Application No. 2017-540421, 7 pages.

* cited by examiner

PAPER SHEET HANDLING APPARATUS AND METHOD FOR CONTROLLING PAPER SHEET HANDLING APPARATUS

CROSS-REFERENCE TO RELATED APPLICATION

This application is a continuation application of International Application PCT/JP2015/076555, filed on Sep. 17, 2015 and designating the U.S., the entire contents of which are incorporated herein by reference.

FIELD

The present invention relates to a paper sheet handling apparatus and a method for controlling the paper sheet handling apparatus.

BACKGROUND

A banknote handling apparatus according to a related art includes, for example, a discriminating unit that discriminates denominations of banknotes that have been input, a holding unit that temporarily stores therein the banknotes discriminated by the discriminating unit, and a storage unit that stores therein banknotes sent from the holding unit. There is a banknote handling apparatus in which the discriminating unit, the holding unit, the storage unit, and a conveying mechanism that conveys the banknotes to each of these units are configured as a banknote handling module (hereinafter, also referred to as a mechanical module). There is also a banknote handling apparatus that includes such a banknote handling module includes another mechanical module that handles bank passbooks or cash cards.

In this type of the banknote handling apparatus, to simplify and improve efficiency of the configuration, electrical power is supplied to each of the mechanical modules from a power supply unit that is provided in the apparatus main body. Then, in the banknote handling apparatus, if maintenance, repair, or the like of each of the mechanical module is performed, after having disconnected the power supply unit in the banknote handling apparatus, maintenance, repair, or the like of a desired mechanical module is performed. Furthermore, there is also a known banknote handling apparatus having the configuration, in which a banknote unit and an application that performs banknote processing, are connected by using a USB cable.

Patent Literature 1: Japanese Laid-open Patent Publication No. 2011-186857

Incidentally, if maintenance or repair of one of the plurality of mechanical modules is performed, because the power supply unit in the apparatus main body is disconnected, the power supply of the other mechanical modules that do not need to be repaired or the like, is also disconnected, and the operation thereof is stopped. Thus, a backup operation of handling data in the banknote handling apparatus may sometimes be needed and it takes time to disconnect the power supply unit. Furthermore, if the power supply unit is turned on again after having installed the mechanical modules in the banknote handling apparatus, it also takes time to return to the state in which the entire banknote handling apparatus can perform a handling process. As a countermeasure against this issue, it is preferable that the banknote handling apparatus is configured such that, by connecting the power supply unit of the banknote handling apparatus to each of the mechanical modules via the respective power supply cables, the power supply can be individually disconnected from the power supply unit for each mechanical module without disconnecting the power supply unit in the banknote handling apparatus.

However, in the mechanical modules described above, a large amount of current is needed to drive the conveying mechanism that conveys the banknotes, bank passbooks, or the like. Thus, after the mechanical modules are disconnected from the power supply unit, inrush currents may possibly be generated when electrical power is supplied from the power supply unit to the mechanical modules. If an inrush current to a mechanical module is flowed when the power supply cable is connected to a connector of the mechanical module, this may possibly result in degradation of the connector or malfunction of the mechanical module.

Accordingly, the present invention has been conceived in light of the circumstances described above, and an object thereof is to provide a paper sheet handling apparatus and a method for controlling the paper sheet handling apparatus that can prevent degradation or malfunction of paper sheet handling modules due to an inrush current from being incurred and that can insert and remove the power supply cable for paper sheet handling module without disconnecting the power supply unit.

SUMMARY

According to an aspect of the embodiments, a paper sheet handling apparatus includes: a control unit that controls the paper sheet handling apparatus; a paper sheet handling module which includes a conveying mechanism that conveys paper sheets, a first control circuit that is controlled by the control unit, and a second control circuit that is controlled by the first control circuit and that controls the conveying mechanism; a power supply unit that supplies electrical power to each of the first control circuit and the second control circuit; a first power supply cable that supplies electrical power from the power supply unit to the first control circuit; and a second power supply cable that supplies electrical power from the power supply unit to the second control circuit, wherein the first control circuit includes a first connecting portion to which the first power supply cable is connected and a first inrush current limiting unit that is connected to the first connecting portion, and the second control circuit includes a second connecting portion to which the second power supply cable is connected and a second inrush current limiting unit that is connected to the second connecting portion.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a paper sheet handling apparatus and a method for controlling the paper sheet handling apparatus disclosed in the present invention will be explained in detail below with reference to the accompanying drawings. Furthermore, the paper sheet handling apparatus and the method for controlling the paper sheet handling apparatus are not limited to the embodiments described below.

Embodiment

Figure 1:
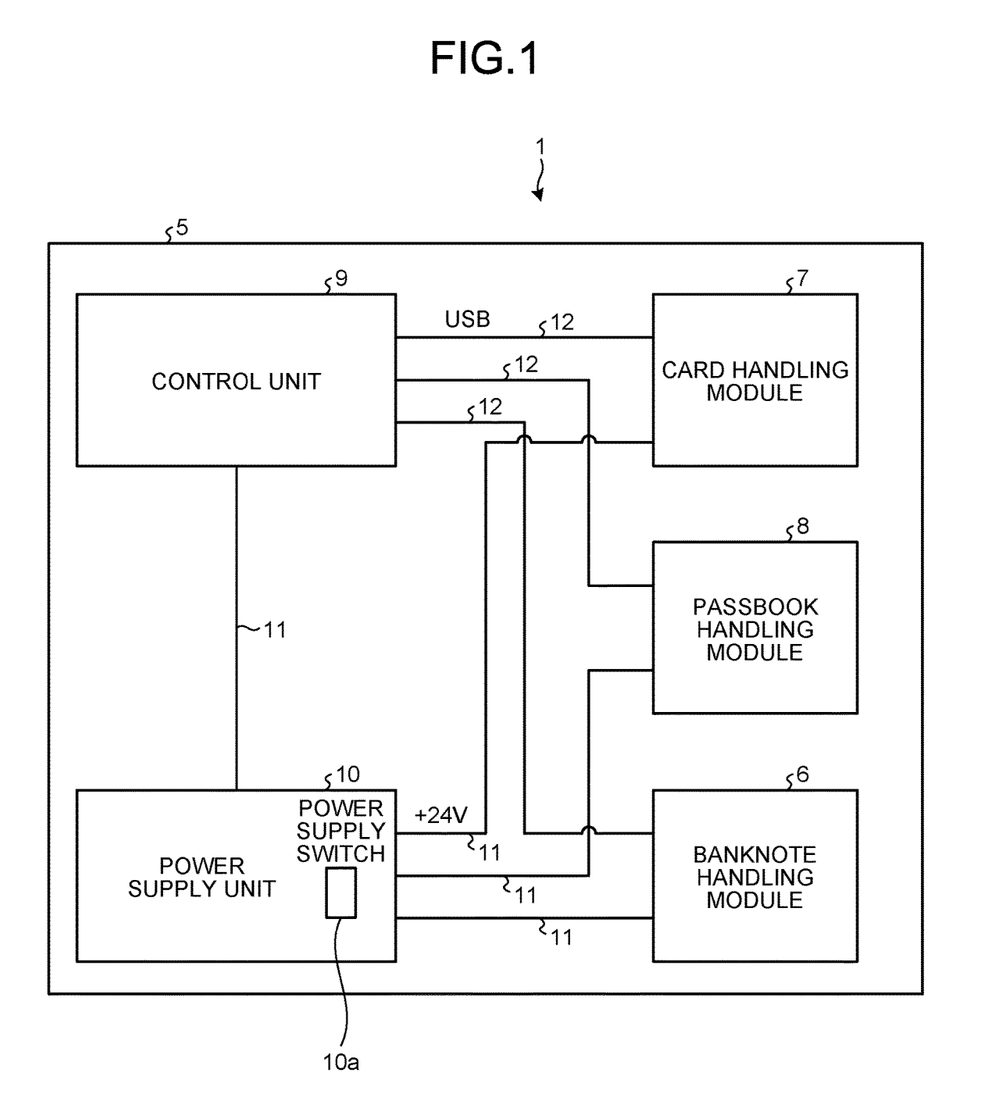
FIG. 1 is a block diagram illustrating a banknote handling apparatus according to an embodiment.

FIG. 1 is a block diagram illustrating a banknote handling apparatus according to an embodiment. As illustrated in FIG. 1, a banknote handling apparatus 1 according to the embodiment includes a banknote handling module 6 that handles banknotes to be input and output, a card handling module 7 that handles cash cards, and a passbook handling module 8 that handles bank passbooks. Each of the mechanical modules 6, 7, and 8 has a conveying mechanism for conveying banknotes, cash cards, and passbooks.

Furthermore, the banknote handling apparatus 1 includes a control unit 9 that controls each of the mechanical modules 6, 7, and 8 as the banknote handling apparatus 1 (own apparatus) and a power supply unit 10 that is a main power supply unit for supplying electrical power to each of the mechanical modules 6, 7, and 8, the control unit 9, and the like. The power supply unit 10 is provided in a apparatus main body 5 and includes a power supply switch 10a. By disconnecting the power supply switch 10a, all of the mechanical modules 6, 7, and 8, the control unit 9, and the like are stopped and the banknote handling apparatus 1 is stopped. Furthermore, the power supply unit 10 is individually connected to each of the mechanical modules 6, 7, and 8, and the control unit 9 via a power supply cable 11. Furthermore, the power supply unit 10 according to the embodiment supplies, by the power supply cable 11, a voltage of about, for example, 24 V to each of the mechanical modules 6, 7, and 8. Furthermore, the control unit 9 and each of the mechanical modules 6, 7, and 8 are individually connected via a universal serial bus (USB) cable 12 that is a signal line that sends a control signal.

Figure 2:
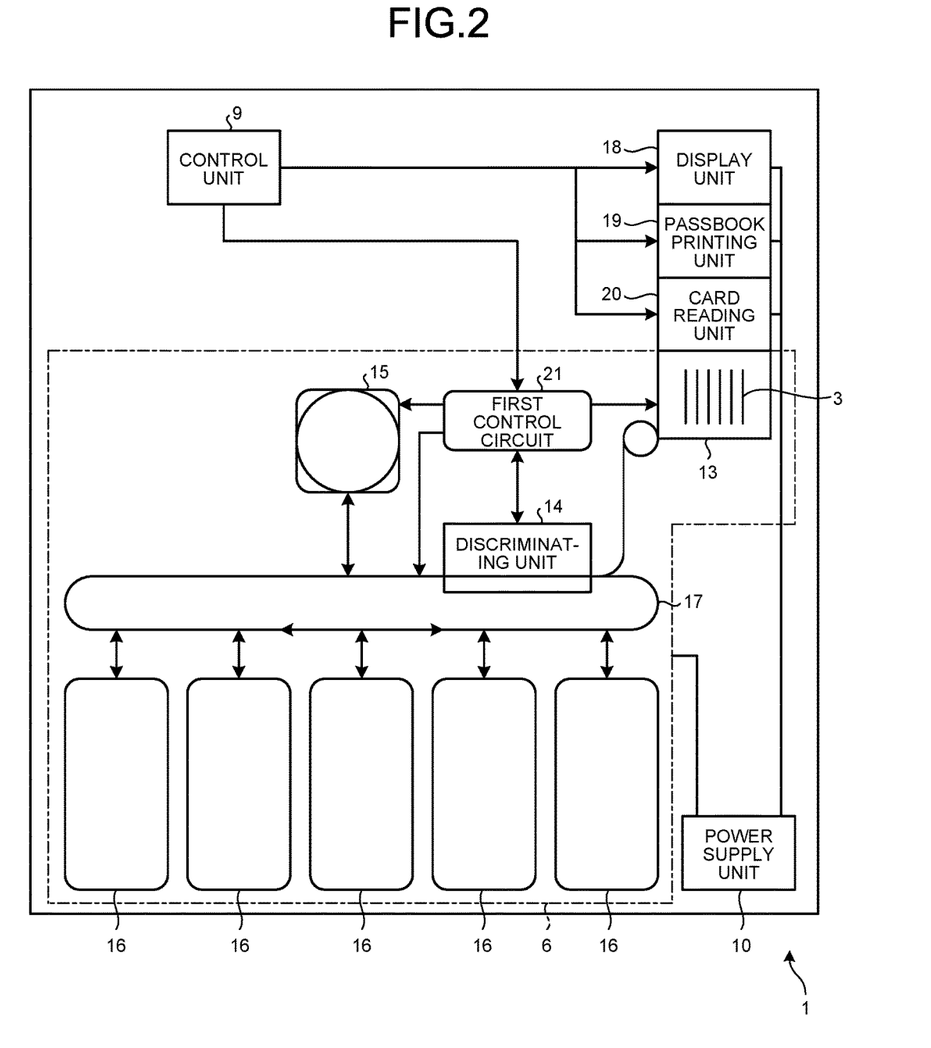
FIG. 2 is a schematic diagram illustrating the banknote handling apparatus according to the embodiment.

In the following, a more specific configuration of the banknote handling apparatus 1 will be described. FIG. 2 is a schematic diagram illustrating the entire banknote handling apparatus according to the embodiment. As illustrated in FIG. 2, the banknote handling module 6 included in the banknote handling apparatus 1 according to the embodiment includes an input-and-output unit 13 that inputs and outputs banknotes 3, a discriminating unit 14 that discriminates the banknotes 3 input to the input-and-output unit 13, and a holding unit 15 that temporarily holds the banknotes 3 conveyed from the discriminating unit 14. Furthermore, the banknote handling apparatus 1 includes a plurality of storage units 16 that stores therein the banknotes 3 sent from the holding unit 15 and a conveying mechanism 17 for conveying the banknotes 3. Each of the units 13 to 16 and the conveying mechanism 17 are controlled by a first control circuit 21 in response to a command received from the control unit 9. Furthermore, although not illustrated, the banknote handling apparatus 1 may also include, as needed, a return unit that returns the banknotes 3 stored in the storage units 16 and a housing unit that houses the banknotes 3.

Furthermore, in the apparatus main body 5 of the banknote handling apparatus 1, a display unit 18 that displays information related to the handling of the banknotes 3 or the like performed by the control unit 9 is provided. Furthermore, the card handling module 7 included in the banknote handling apparatus 1 includes a conveying mechanism (not illustrated) that conveys cash cards and a card reading unit 20 that receives cash cards. Furthermore, the passbook handling module 8 included in the banknote handling apparatus 1 includes a conveying mechanism (not illustrated) that conveys bank passbooks and a passbook printing unit 19 that prints handling data onto a bank passbook.

In the embodiment, the banknotes 3 are used an example of paper sheets; however, the embodiment is not limited to the banknotes 3 and other paper sheets, such as vouchers, may also be used. Furthermore, in the embodiment, a description will be given by using the banknote handling module 6 as an example of the paper sheet handling module; however, an example of the paper sheets indicated here includes passbooks and cash cards handled by the banknote handling apparatus 1. Namely, the paper sheet handling module is not limited to the banknote handling module 6 but may also be applied to the card handling module 7 or the passbook handling module 8 described above. Furthermore, the paper sheet handling module may also be applied to another handling module as long as the handling module includes a conveying mechanism for conveying paper sheets, a control circuit that is controlled by a control unit, and a driving circuit that is controlled by the control circuit and that controls the conveying mechanism.

Figure 3:
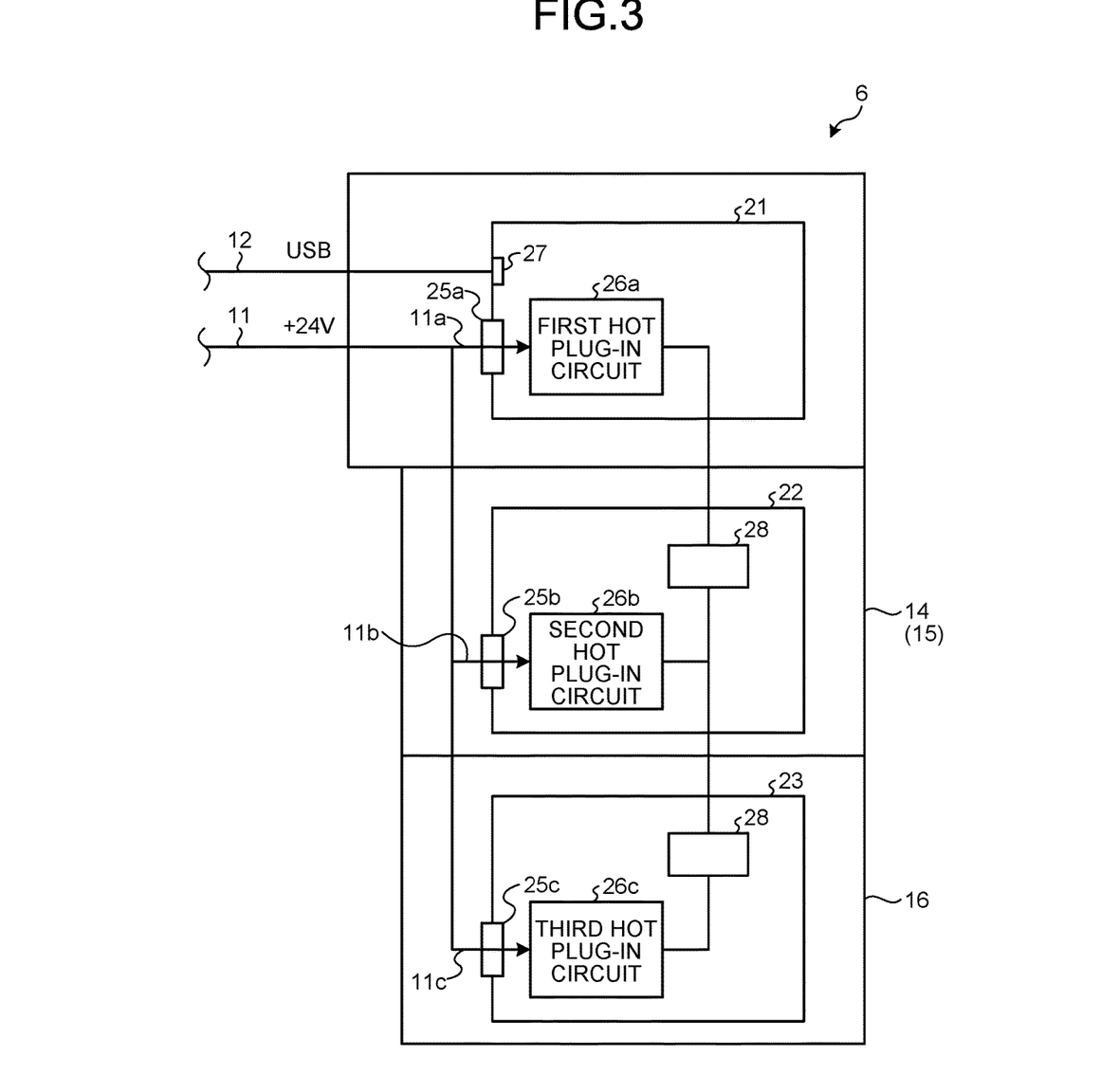
FIG. 3 is a schematic diagram illustrating a banknote handling module included in the banknote handling apparatus according to the embodiment.

FIG. 3 is a schematic diagram illustrating a banknote handling module included in the banknote handling apparatus according to the embodiment. The banknote handling module 6 includes the above-described conveying mechanism 17 (see FIG. 2) for conveying the banknotes 3; as illustrated in FIG. 3, the first control circuit 21 that is controlled by the control unit 9; a second control circuit 22 that is controlled by the first control circuit 21 and that controls the conveying mechanism 17; and a third control circuit 23 that is controlled by the first control circuit 21 and that controls the conveying mechanism 17. Furthermore, in the banknote handling module 6, electrical power is supplied to each of the first, the second, and the third control circuits 21, 22, and 23 from the power supply unit 10 by a first, a second, and a third power supply cables 11a, 11b, and 11c, respectively, included in the power supply cable 11 described above.

The first control circuit 21 includes a first connecting portion 25a to which the first power supply cable 11a is connected, and a first hot plug-in circuit 26a that is connected to the first connecting portion 25a and that functions as a first inrush current limiting unit. The second control circuit 22 includes, similarly to the first control circuit 21, a second connecting portion 25b to which the second power supply cable 11b is connected and a second hot plug-in circuit 26b that is connected to the second connecting portion 25b and that functions as a second inrush current limiting unit. Furthermore, similarly, the third control circuit 23 includes a third connecting portion 25c to which the third power supply cable 11c is connected and a third hot plug-in circuit 26c that is connected to the third connecting portion 25c and that functions as a third inrush current limiting unit.

As the first, the second, and the third connecting portions 25a, 25b, and 25c, so-called connectors are used.

Furthermore, the first control circuit 21 includes a USB terminal 27 to which the USB cable 12 is connected, and is connected to the control unit 9 via the USB cable 12. Furthermore, each of the second and the third control circuits 22 and 23 includes a data communication module 28 that performs communication of data with the first control circuit 21. The second and the third control circuits 22 and 23 can be operated only when electrical power is supplied from the power supply unit 10 to the first connecting portion 25a in the first control circuit 21, based on the data communication performed by the data communication module 28. Namely, for example, the data communication module 28 includes a control element, such as an LSI (not illustrated), or the like, and the control element recognizes a break of data communication with the first control circuit 21 performed via the data communication module 28, whereby the second and the third control circuits 22 and 23 are stopped. This type of control elements may also be provided in the second and the third control circuits 22 and 23, in addition to data communication module. Furthermore, the data communication is performed by, using a parallel bus or a serial bus, a technology, such as RS232C, RS485, LVDS, or the like.

Furthermore, a printed circuit board is used for the first, the second, and the third control circuits 21, 22, and 23. The first control circuit 21 corresponds to the main circuit in the banknote handling module 6. The second and the third control circuits 22 and 23 correspond to sub circuits, and are driver circuits, which drive and control the conveying mechanism 17 associated with the discriminating unit 14, the holding unit 15, and the storage units 16. Furthermore, the second and the third control circuits 22 and 23 are connected with each other in parallel, and are connected to the first control circuit 21 in series.

Furthermore, when electrical power is not supplied to the second control circuit 22 from the power supply unit 10, the control unit 9 displays, on the display unit 18, the information related to control that is being performed by the first control circuit 21 or the third control circuit 23. Similarly, when electrical power is not supplied to the third control circuit 23 from the power supply unit 10, the control unit 9 displays, on the display unit 18, the information related to control that is being performed by the first control circuit 21 or the second control circuit 22.

Furthermore, in FIG. 3, for convenience of illustration, only the first, the second, and the third control circuits 21, 22, and 23 are illustrated; however, a control circuit may also be provided in association with each of the units, such as each of the discriminating unit 14, the holding unit 15, the storage units 16, and the like. In the embodiment, as an example, the second control circuit 22 is configured to drive and control the conveying mechanism 17 or the like associated with the discriminating unit 14 and the holding unit 15, and the third control circuit 23 is configured to drive and control the conveying mechanism 17 associated with the plurality of the storage units 16.

Furthermore, in the banknote handling module 6 according to the embodiment, the first control circuit 21 is provided independent from the discriminating unit 14 and the holding unit 15; however, the configuration is not limited to this. The first control circuit 21 may also be configured to be included in, for example, the discriminating unit 14 or may also be configured to control the discrimination sensor in the discriminating unit 14, in addition to driving and controlling the conveying mechanism 17 associated with the discriminating unit 14.

Furthermore, in FIG. 3, for the sake of convenience, the first, the second and the third power supply cables 11a, 11b, and 11c are collectively illustrated, and the power supply cable 11 that supplies electrical power to the banknote handling module 6 from the power supply unit 10, includes the first, the second, and the third power supply cables 11a, 11b, and 11c. Furthermore, in the embodiment, the first, the second, and the third power supply cables 11a, 11b, and 11c are collected as the power supply cable 11; however, it may also be possible to include the first, the second, and the third power supply cables 11a, 11b, and 11c that connect the power supply unit 10 to the first, the second, and the third control circuits 21, 22, and 23, respectively, in the banknote handling module 6.

Figure 4:
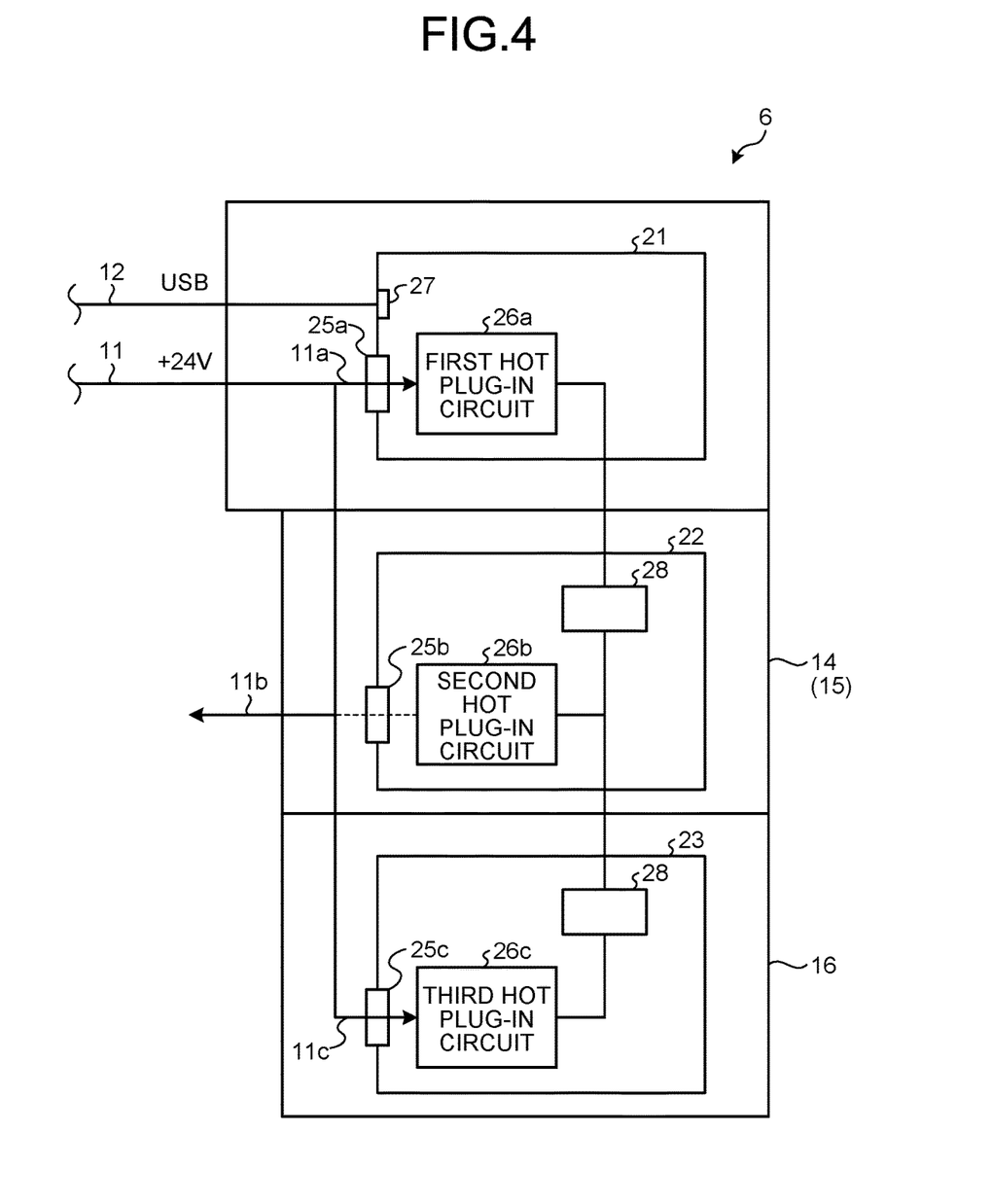
FIG. 4 is a schematic diagram for explaining a state in which maintenance or repair of the banknote handling module included in the banknote handling apparatus according to the embodiment is performed.

Behavior of the Power Supply in Each of the Control Circuits at the Time of Maintenance or Repair of the Banknote Handling Module FIG. 4 is a schematic diagram for explaining a state in which maintenance or repair of the banknote handling module 6 included in the banknote handling apparatus 1 according to the embodiment, is performed. In the following, as illustrated in FIG. 4, a description will be given of a case in which, in the banknote handling module 6, for example, repair of the second control circuit 22 is performed. In this case, in the banknote handling module 6, in the state in which electrical power is supplied to the first, the second, and the third control circuits 21, 22, and 23 from the power supply unit 10 via the first, the second, and the third power supply cables 11a, 11b, and 11c, respectively, the second power supply cable 11b is removed from the second connecting portion 25b in the second control circuit 22.

The second control circuit 22 stops its operation when the second power supply cable 11b is removed and it is possible to repair the conveying mechanism 17 that is driven and controlled by the second control circuit 22. At this time, for example, if the second control circuit 22 is configured to control the discriminating unit 14, the second control circuit 22 can repair the discrimination sensor, or the like in the discriminating unit 14. Furthermore, during a period of time for which the second control circuit 22 is stopped, in the banknote handling module 6, each of the first control circuit 21 and the third control circuit 23 continues its operation. Thus, in the banknote handling module 6, for example, during the repair of the discriminating unit 14, the holding unit 15 or the like that is driven and controlled by the third control circuit 23, can continue its operation. Furthermore, the first control circuit 21 can send and receive, to and from the control unit 9, the handling data of each of the units 15 and 16 other than the discriminating unit 14 that is being repaired.

Here, a case, in which the second power supply cable 11b is removed from the second control circuit 22, has been described; however, in also a case in which the third power supply cable 11c is removed from the third control circuit 23, the same behavior of the power supply in the second control circuit 22 is performed. Furthermore, if electrical power is supplied to the first control circuit 21 from the power supply unit 10 by the first power supply cable 11a, even when the second and the third power supply cables 11b and 11c are removed from the second and the third control circuits 22 and 23, respectively, the first control circuit 21 continues its operation. Thus, the banknote handling module 6 can send and receive handling data or the like to and from the control unit 9 via the first control circuit 21.

In addition, even when the banknote handling module 6 is being repaired, because the power supply unit 10 in the banknote handling apparatus 1 is not disconnected, the passbook handling module 8 and the card handling module 7 continue their operation and the state of the banknote handling apparatus 1 is kept such that the banknote handling apparatus 1 can perform information communication with an external server, or the like. Then, after the repair of the banknote handling module 6, by connecting the power supply cable to the repaired control circuit, all of the functions of the banknote handling module 6 are promptly returned. Accordingly, when repairing the banknote handling module 6, because the power supply unit 10 for the entire banknote handling apparatus 1 is not disconnected, it is possible to reduce the time needed to disconnect the power supply of the banknote handling module 6 and is possible to reduce the time needed to return the banknote handling operation of the banknote handling apparatus 1 after the repair.

In contrast, in the banknote handling module 6, if the first power supply cable 11a has been removed from the first connecting portion 25a in the first control circuit 21, the first control circuit 21 is stopped. If the first control circuit 21 is stopped, even in the state in which electrical power is supplied to the second and the third control circuits 22 and 23 from the power supply unit 10 by the second and the third power supply cables 11b and 11c, by recognizing a break of data communication with the first control circuit 21, the second and the third control circuits 22 and 23 are stopped together with the stoppage of the first control circuit 21. Consequently, it is possible to prevent, when the second and the third control circuits 22 and 23 continue their operation in the state in which the first control circuit 21 is stopped, malfunction of the conveying mechanism 17, the discriminating unit 14, the holding unit 15, or the like, that is driven and controlled by the second and the third control circuits 22 and 23.

As described above, a case, where the first power supply cable 11a is removed from the first control circuit 21, corresponds to a case, where maintenance or repair of the entire banknote handling module 6 is performed. At this time, in also the state in which the entire banknote handling module 6 is stopped, in the banknote handling apparatus 1, the power supply unit 10 is not disconnected. Thus, in the banknote handling apparatus 1, even if maintenance or repair of the entire banknote handling module 6 is performed, the card handling module 7 and the passbook handling module 8 continue their operation, and it is possible to keep the state in which the control unit 9 can perform information communication with the external server, or the like.

Then, after having performed maintenance or repair of one of the control circuits 21, 22, and 23, an inrush current may sometimes be generated when electrical power is supplied from the power supply unit 10 due to connections of the power supply cables 11a, 11b, and 11c to the connecting portions 25a, 25b, and 25c included in the control circuits 21, 22, and 23, respectively. Even if an inrush current is generated when the power supply is turned on again, in each of the control circuits 21, 22, and 23, the inrush current is appropriately limited by each of the hot plug-in circuits 26a, 26b, and 26c connected to the connecting portions 25a, 25b, and 25c, respectively. Consequently, it is possible to prevent degradation of each of the connecting portions 25a, 25b, and 25c in the control circuits 21, 22, and 23, respectively or malfunction of each of the control circuits 21, 22, and 23.

Figure 5:
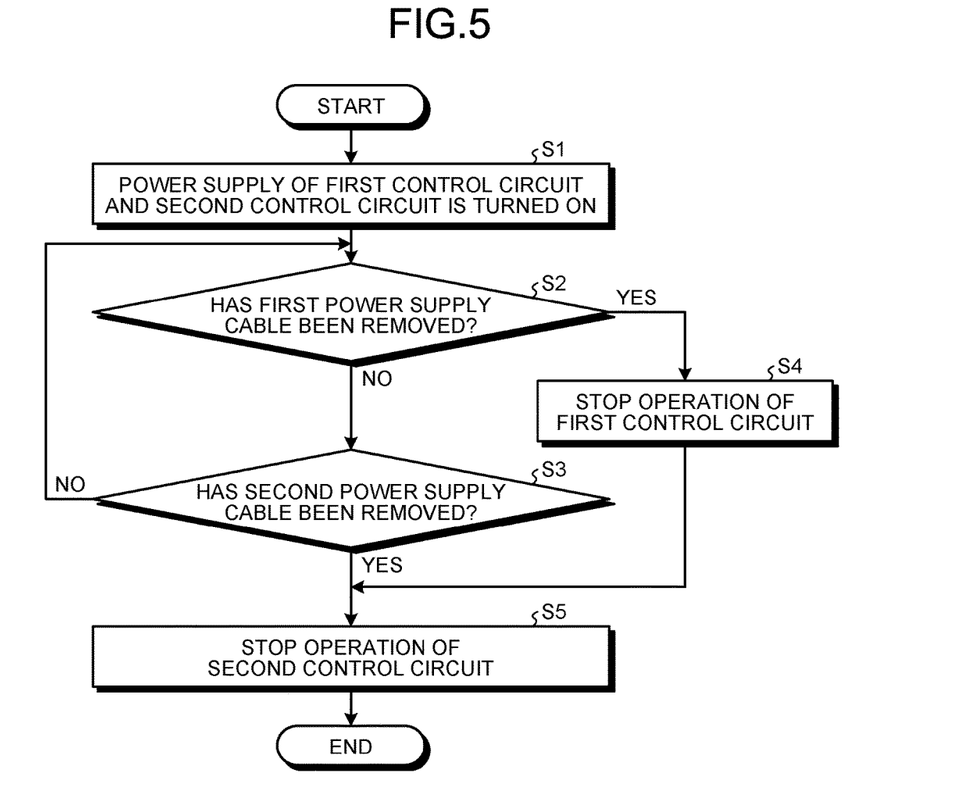
FIG. 5 is a flowchart illustrating the behavior of the power supply in each of control circuits in the banknote handling module according to the embodiment.

FIG. 5 is a flowchart illustrating the behavior of the power supply of each of control circuits in the banknote handling module 6 according to the embodiment. First, during the operation of the banknote handling apparatus 1, in the banknote handling module 6, the first, the second, and the third control circuits 21, 22, and 23 is connected to the power supply unit 10 via the first, the second, and the third power supply cables 11a, 11b, and 11c, respectively. In the following, to simplify the explanation, the first and the second control circuits 21 and 22 and the first and the second power supply cables 11a and 11b, will be described.

In the first control circuit 21 and the second control circuit 22, electrical power is supplied from the power supply unit 10 by the first and the second power supply cables 11a and 11b, respectively, and, as illustrated in FIG. 5, the power supply of each of the first control circuit 21 and the second control circuit 22 is in an ON state (Step S1). When maintenance or repair of the banknote handling module 6 is performed, the first power supply cable 11a is selectively removed from the first control circuit 21 or the second power supply cable 11b is selectively disconnected from the second control circuit 22 while the power supply unit 10 is maintained in the ON state.

The control unit 9 and the first control circuit 21 determine whether the first power supply cable 11a has been removed from the first connecting portion 25a in the first control circuit 21 (Step S2). Subsequently, the control unit 9 and the first control circuit 21 determine whether the second power supply cable 11b has been removed from the second connecting portion 25b in the second control circuit 22 (Step S3).

If the first power supply cable 11a has been removed from the first control circuit 21 (Yes at Step S2), the first control circuit 21 is stopped (Step S4). Subsequently, if the first control circuit 21 is stopped, even if electrical power is supplied to the second control circuit 22 by the second power supply cable 11b, the second control circuit 22 is stopped due to a break of data communication with the first control circuit 21 (Step S5).

In contrast, if the first power supply cable 11a has not been removed from the first control circuit 21 (No at Step S2), the process moves to Step S3 while the first control circuit 21 continues its operation. If the second power supply cable 11b has been removed from the second control circuit 22 (Yes at Step 3), the second control circuit 22 is stopped (Step S5). Furthermore, if the second power supply cable 11b has not been removed from the second control circuit 22 (No at Step 3), the process returns to Step S2.

In the above, the first and the second control circuits 21 and 22 and the first and the second power supply cables 11a and 11b have been described; however, the behavior of the power supply in each of the third control circuit 23 and the third power supply cable 11c, is the same as the power supply in each of the second control circuit 22 and the second power supply cable 11b described above. Furthermore, because the second and the third control circuits 22 and 23 are connected in parallel, even if the second power supply cable 11b is removed from the second control circuit 22 and is stopped, the third control circuit 23 continues its operation, similarly to the first control circuit 21.

As described above, in the banknote handling module 6, for example, even in the state in which the second control circuit 22 is stopped due to maintenance or repair of the second control circuit 22, the first control circuit 21 continues its operation. Thus, in the banknote handling module 6, only a part of function is stopped and the other functions continue their operation. Namely, in the banknote handling module 6, even when the discriminating unit 14, in which maintenance or repair is being performed, is stopped, the holding unit 15 and the storage units 16 can continue the functions that can be operated regardless of the stoppage of the discriminating unit 14. Consequently, in the banknote handling apparatus 1, even if a part of function of the banknote handling module 6 is stopped, each of the units, which are being operated in the banknote handling module 6, can continue, by the control unit 9, information communication with an external server, or the like.

Furthermore, the control unit 9 can display, on the display unit 18, the information related to control performed by the first control circuit 21 that continues its operation. At this time, as the information displayed on the display unit 18, for example, information indicating, to a user, that the banknote handling apparatus 1 (the banknote handling module 6) is being repaired, or information indicating that a part of the handing function of the banknote handling apparatus 1 is paused, can be displayed.

For example, if the discriminating unit 14 in the banknote handling module 6 is stopped and the storage units 16 are being operated, the control unit 9 displays, on the display unit 18, the information indicating that only an output of the banknotes 3 is possible. Consequently, convenience of the user of the banknote handling apparatus 1 can be enhanced. Furthermore, in addition to the control such that information related to the banknote handling module 6 is displayed, the control unit 9 may also perform control such that the control unit 9 performs communication with an external server, or the like.

In the method for controlling the banknote handling apparatus 1 described above, in the state in which electrical power is supplied to the first control circuit 21 from the power supply unit 10 via the first power supply cable 11a and electrical power is supplied to the second control circuit 22 from the power supply unit 10 via the second power supply cable 11b, when the first power supply cable 11a is removed from the first connecting portion 25a in the first control circuit 21, the first control circuit 21 and the second control circuit 22 are stopped. Furthermore, when the second power supply cable 11b is removed from the second connecting portion 25b in the second control circuit 22, the second control circuit 22 is stopped without the first control circuit 21 being stopped.

The banknote handling apparatus 1 according to the embodiment includes the first control circuit 21 that includes the first hot plug-in circuit 26a that is connected to the first connecting portion 25a to which the first power supply cable 11a is connected, and the second control circuit 22 that includes the second hot plug-in circuit 26b that is connected to the second connecting portion 25b to which the second power supply cable 11b is connected. Consequently, when the first and the second power supply cables 11a and 11b are connected to the connecting portions 25a and 25b in the first and the second control circuits 21 and 22, respectively, it is possible to prevent degradation of each of the connecting portions 25a and 25b or malfunction of the banknote handling module 6 from being incurred, due to an inrush current flowing in the first and the second control circuits 21 and 22.

Furthermore, according to the banknote handling module 6, because electrical power is individually supplied to the first and the second control circuits 21 and 22 from the power supply unit 10 via the first and the second power supply cables 11a and 11b, only the power supply of one of the first and the second control circuits 21 and 22 can be selectively disconnected. Consequently, it is possible to stop a part of the banknote handling module 6, for example, only the discriminating unit 14, and is possible to continue the operation of the other parts, for example, the holding unit 15 and the storage units 16. Accordingly, when a part of the banknote handling apparatus 1, for example, a part of the conveying mechanism 17 is repaired, because the power supply unit 10 in the banknote handling apparatus 1 is not disconnected, it is possible to avoid the entire banknote handling apparatus 1 from being stopped. Consequently, when performing maintenance or repair of the banknote handling module 6, it is possible to reduce the time needed to disconnect the power supply of the banknote handling module 6 and is possible to reduce the time needed to return the banknote handling operation of the banknote handling apparatus 1 after the repair.

Furthermore, in the embodiment described above, electrical power is supplied from the single power supply unit 10 to the first and the second control circuits 21 and 22 via the first and the second power supply cables 11a and 11b, respectively; however, the configuration is not limited to this. Electrical power may also be individually supplied, as needed, from two power supply units to the first and the second control circuits 21 and 22 via the first and the second power supply cables 11a and 11b.

Furthermore, in the banknote handling apparatus 1 according to the embodiment, the second control circuit 22 performs data communication with the first control circuit 21 only when the second control circuit 22 is connected to the first control circuit 21 and electrical power is supplied to the first connecting portion 25a from the power supply unit 10, and thus, the operation of the first control circuit 22 is possible only when the data communication is performed. Consequently, it is possible to prevent malfunction of the conveying mechanism 17 or the like from occurring when, in the state in which the first control circuit 21 is stopped, the second control circuit 22 to which electrical power is being supplied continues its operation. Namely, the first and the second power supply cables 11a and 11b can be inserted and removed for the banknote handling modules 6 without disconnecting the power supply unit 10. In addition, by preventing malfunction of the second control circuit 22 in this way, the order in which the first and the second power supply cables 11a and 11b are connected to the first and the second control circuits 21 and 22, respectively, can be freely determined. Consequently, it is possible to improve the flexibility at the time of handling the first and the second power supply cables 11a and 11b when power supply of the first and the second control circuits 21 and 22 is turned on.

Furthermore, the control unit 9 in the banknote handling apparatus 1 according to the embodiment displays, on the display unit 18, the information related to the control performed, by the first control circuit 21, when electrical power is not supplied to the second control circuit 22 from the power supply unit 10. Consequently, even if a part of the function of the banknote handling module 6 is stopped when maintenance or repair of the second control circuit 22 is being performed, the control unit 9 can display, on the display unit 18, the information related to the other functions of the banknote handling module 6 performed by the first control circuit 21, such as the information indicating that, for example, only an output of the banknotes 3 is possible. Consequently, it is possible to enhance convenience of a user of the banknote handling apparatus 1.

According to an aspect of an embodiment of the paper sheet handling apparatus disclosed in the present invention, it is possible to prevent degradation or malfunction of the paper sheet handling modules due to an inrush current from being incurred.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A paper sheet handling apparatus comprising:
    a control unit that controls the paper sheet handling apparatus;
    a paper sheet handling module which includes a conveying mechanism that conveys paper sheets, a first control circuit that is controlled by the control unit, and a second control circuit that is controlled by the first control circuit and that controls the conveying mechanism;
    a power supply unit that supplies electrical power to each of the first control circuit and the second control circuit;
    a first power supply cable that supplies electrical power from the power supply unit to the first control circuit; and
    a second power supply cable that supplies electrical power from the power supply unit to the second control circuit, wherein
    the first control circuit includes a first connecting portion to which the first power supply cable is connected and a first inrush current limiting unit that is connected to the first connecting portion, and
    the second control circuit includes a second connecting portion to which the second power supply cable is connected and a second inrush current limiting unit that is connected to the second connecting portion, wherein
        the second control circuit is connected to the first control circuit and is able to be operated only when electrical power is supplied to the first connecting portion from the power supply unit, and
        a control element recognizes a break of data communication with the first control circuit performed via a data communication module, so that the second control circuit is stopped.

2. The paper sheet handling apparatus according to claim 1, further comprising an apparatus main body on which the paper sheet handling module is mounted and which includes the power supply unit and a display unit that displays information related to control performed by the control unit, wherein
    the control unit allows the display unit to display information related to control performed by the first control circuit when electrical power is not supplied to the second control circuit from the power supply unit.

3. The paper sheet handling apparatus according to claim 1, wherein
    the paper sheet handling module includes a discriminating unit that discriminates the paper sheets, and
    the second control circuit controls the discriminating unit.

4. A method for controlling a paper sheet handling apparatus which includes a paper sheet handling module including a conveying mechanism that conveys paper sheets, a first control circuit that is controlled by a control unit that controls the paper sheet handling apparatus, a second control circuit that is controlled by the first control circuit and that controls the conveying mechanism, the method for controlling the paper sheet handling apparatus comprising:
    stopping, in a state in which electrical power is supplied to the first control circuit from a power supply unit via a first power supply cable and electrical power is supplied to the second control circuit from the power supply unit via a second power supply cable, when the first power supply cable is removed from a first connecting portion in the first control circuit, the first control circuit and the second control circuit; and
    stopping, in the state in which electrical power is supplied to the first control circuit and the second control circuit from the power supply unit, when the second power supply cable is removed from a second connecting portion in the second control circuit, the second control circuit without stopping the first control circuit, wherein
        the second control circuit is connected to the first control circuit and is able to be operated only when electrical power is supplied to the first connecting portion from the power supply unit, and
        a control element recognizes a break of data communication with the first control circuit performed via a data communication module, so that the second control circuit is stopped.

* * * * *